(12) United States Patent
Dar et al.

(10) Patent No.: US 12,373,560 B2
(45) Date of Patent: Jul. 29, 2025

(54) SYSTEM AND METHOD FOR MACHINE LEARNING-BASED DETECTION OF RANSOMWARE ATTACKS ON A STORAGE SYSTEM

(71) Applicant: Dell Products, L.P., Round Rock, TX (US)

(72) Inventors: Shaul Dar, Petach Tikva (IL); Ramakanth Kanagovi, Bengaluru (IN); Guhesh Swaminathan, Tamil Nadu (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 264 days.

(21) Appl. No.: 17/994,495

(22) Filed: Nov. 28, 2022

(65) Prior Publication Data

US 2024/0176882 A1     May 30, 2024

(51) Int. Cl.
*G06F 21/56*     (2013.01)
*G06F 21/55*     (2013.01)

(52) U.S. Cl.
CPC .......... *G06F 21/568* (2013.01); *G06F 21/554* (2013.01)

(58) Field of Classification Search
CPC .............................. G06F 21/568; G06F 21/554
See application file for complete search history.

(56) References Cited

U.S. PATENT DOCUMENTS

| | | | |
|---|---|---|---|
| 10,970,395 B1* | 4/2021 | Bansal | G06F 21/566 |
| 11,010,474 B2* | 5/2021 | Hu | G06F 11/3089 |
| 2020/0250522 A1* | 8/2020 | Meiri | G06N 3/08 |
| 2022/0083657 A1* | 3/2022 | Karr | G06F 11/108 |
| 2022/0092180 A1* | 3/2022 | Richardson | G06F 11/108 |
| 2022/0291986 A1* | 9/2022 | Klein | G06F 3/0604 |
| 2022/0374519 A1* | 11/2022 | Botelho | G06F 11/1464 |

OTHER PUBLICATIONS

Yang CY, Sahita R. Towards a Resilient Machine Learning Classifier—a Case Study of Ransomware Detection. arXiv preprint arXiv:2003.06428. Mar. 13, 2020. (Year: 2020).*
Ayub MA, Continella A, Siraj A. An i/o request packet (irp) driven effective ransomware detection scheme using artificial neural network. In2020 IEEE 21st International Conference on Information Reuse and Integration for Data Science (IRI) Aug. 11, 2020 (pp. 319-324). IEEE. (Year: 2020).*

* cited by examiner

*Primary Examiner* — James R Turchen
(74) *Attorney, Agent, or Firm* — Brian J. Colandreo; Heath M. Sargeant; Holland & Knight LLP

(57) ABSTRACT

A method, computer program product, and computing system for processing a plurality of input/output (IO) requests associated with a plurality of storage objects of a storage system. A plurality of IO features are generated using the plurality of IO requests. The plurality of IO features are processed using a machine learning model. A ransomware attack on the storage system may be monitored for in real-time based upon, at least in part, the processing of the plurality of IO features using the machine learning model.

18 Claims, 5 Drawing Sheets

SYSTEM AND METHOD FOR MACHINE LEARNING-BASED DETECTION OF RANSOMWARE ATTACKS ON A STORAGE SYSTEM

BACKGROUND

Ransomware attacks are a primary security threat in today's world and are becoming more and more prevalent. Accurate detection is crucial, since a false negative is a failure to detect an ongoing ransomware attack, while a false positive indicates a false alarm which may cause users of a storage system to halt normal business operations and start a lengthy investigation process. There are different ransomware variants utilizing particular modes of operation (threats, tactics and procedures) which makes detecting a ransomware attack in general (i.e., a binary classification) more challenging, and detection of a specific type of attack (i.e., multi-class classification) even more challenging. Conventional approaches are focused on detection of ransomware attacks on a host, where the attack is occurring (i.e., where the ransomware is being executed). However, in an enterprise setting, the storage is typically separate from the host, using a file or block storage device or storage system. Detection of ransomware attacks on the storage system as opposed to the host poses a unique challenge since the storage system does not have direct access to information about the execution of the ransomware attack.

SUMMARY OF DISCLOSURE

In one example implementation, a computer-implemented method executed on a computing device may include, but is not limited to, processing a plurality of input/output (IO) requests associated with a plurality of storage objects of a storage system. A plurality of IO features are generated using the plurality of IO requests. The plurality of IO features are processed using a machine learning model. A ransomware attack on the storage system may be monitored for in real-time based upon, at least in part, the processing of the plurality of IO features using the machine learning model.

One or more of the following example features may be included. The plurality of storage objects may include at least one of a block storage object and a file storage object. The plurality of IO features include one or more of: a number of IO requests per second (IOPS); a total number of read IO requests; a total number of write IO requests; a percentage of sequential read IO requests; and a percentage of sequential write IO requests. Generating the plurality of IO features using the plurality of IO requests may include: aggregating the plurality of IO requests periodically; and generating the plurality of IO features using the aggregated plurality of IO requests. The machine learning model may be trained by processing a plurality of IO requests associated with one or more known ransomware attacks. Monitoring for a ransomware attack on the storage system in real-time may include identifying a known ransomware attack based upon, at least in part, the processing of the plurality of IO features using the machine learning model. In response to monitoring a ransomware attack, a remedial action may be performed on the storage system.

In another example implementation, a computer program product resides on a computer readable medium that has a plurality of instructions stored on it. When executed by a processor, the instructions cause the processor to perform operations that may include, but are not limited to, processing a plurality of input/output (IO) requests associated with a plurality of storage objects of a storage system. A plurality of IO features are generated using the plurality of IO requests. The plurality of IO features are processed using a machine learning model. A ransomware attack on the storage system may be monitored for in real-time based upon, at least in part, the processing of the plurality of IO features using the machine learning model.

One or more of the following example features may be included. The plurality of storage objects may include at least one of a block storage object and a file storage object. The plurality of IO features include one or more of: a number of IO requests per second (IOPS); a total number of read IO requests; a total number of write IO requests; a percentage of sequential read IO requests; and a percentage of sequential write IO requests. Generating the plurality of IO features using the plurality of IO requests may include: aggregating the plurality of IO requests periodically; and generating the plurality of IO features using the aggregated plurality of IO requests. The machine learning model may be trained by processing a plurality of IO requests associated with one or more known ransomware attacks. Monitoring for a ransomware attack on the storage system in real-time may include identifying a known ransomware attack based upon, at least in part, the processing of the plurality of IO features using the machine learning model. In response to monitoring a ransomware attack, a remedial action may be performed on the storage system.

In another example implementation, a computing system includes at least one processor and at least one memory architecture coupled with the at least one processor, wherein the at least one processor is configured to process a plurality of input/output (IO) requests associated with a plurality of storage objects of a storage system. A plurality of IO features are generated using the plurality of IO requests. The plurality of IO features are processed using a machine learning model. A ransomware attack on the storage system may be monitored for in real-time based upon, at least in part, the processing of the plurality of IO features using the machine learning model.

One or more of the following example features may be included. The plurality of storage objects may include at least one of a block storage object and a file storage object. The plurality of IO features include one or more of: a number of IO requests per second (IOPS); a total number of read IO requests; a total number of write IO requests; a percentage of sequential read IO requests; and a percentage of sequential write IO requests. Generating the plurality of IO features using the plurality of IO requests may include: aggregating the plurality of IO requests periodically; and generating the plurality of IO features using the aggregated plurality of IO requests. The machine learning model may be trained by processing a plurality of IO requests associated with one or more known ransomware attacks. Monitoring for a ransomware attack on the storage system in real-time may include identifying a known ransomware attack based upon, at least in part, the processing of the plurality of IO features using the machine learning model. In response to monitoring a ransomware attack, a remedial action may be performed on the storage system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example fea-

BRIEF DESCRIPTION OF THE DRAWINGS

Like reference symbols in the various drawings indicate like elements.

DETAILED DESCRIPTION

System Overview

Figure 1:
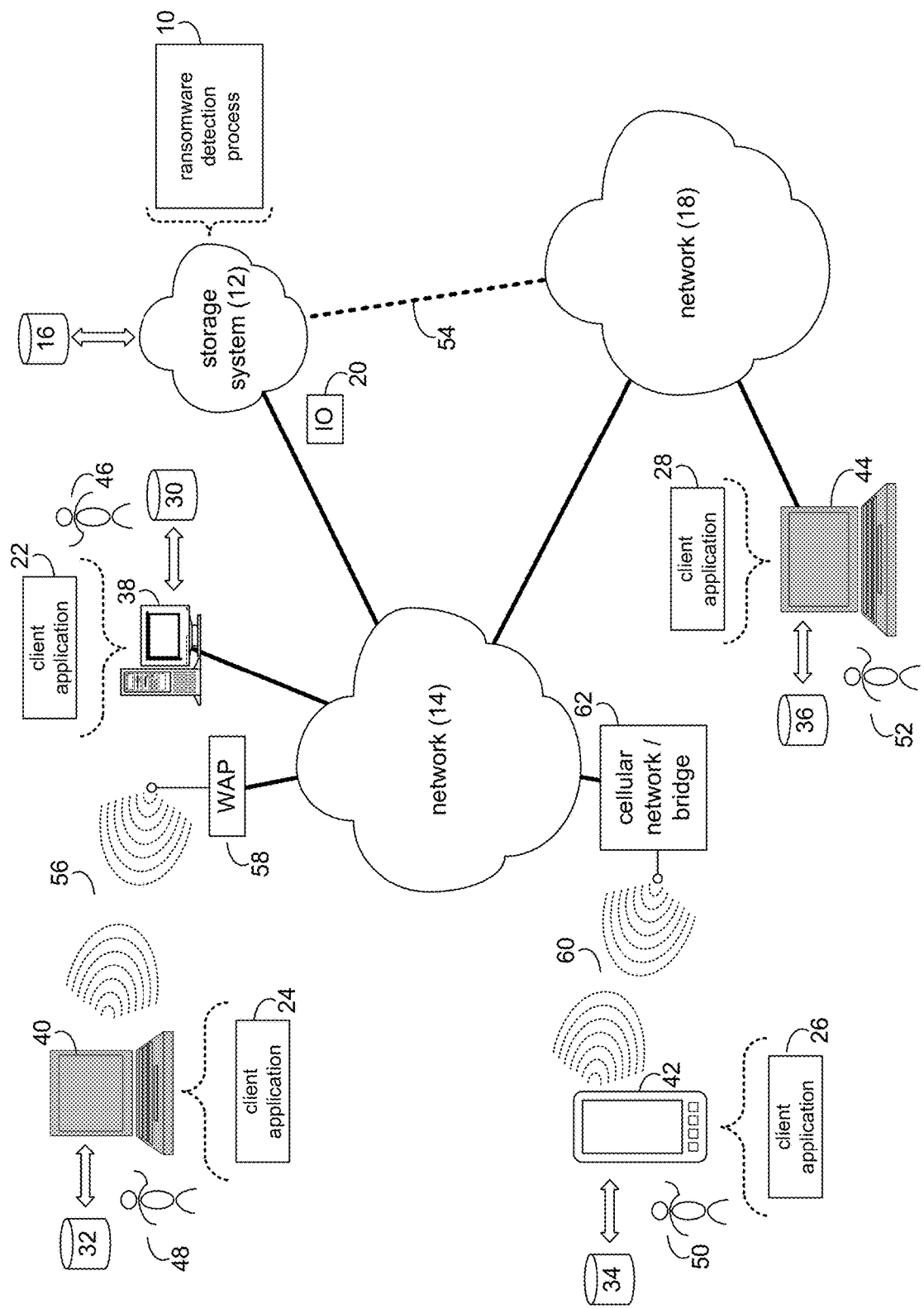
FIG. 1 is an example diagrammatic view of a storage system and a ransomware detection process coupled to a distributed computing network according to one or more example implementations of the disclosure.

Referring to FIG. 1, there is shown ransomware detection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of ransomware detection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of ransomware detection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a ransomware detection process, such as ransomware detection process 10 of FIG. 1, may include but is not limited to, processing a plurality of input/output (IO) requests associated with a plurality of storage objects of a storage system. A plurality of IO features are generated using the plurality of IO requests. The plurality of IO features are processed using a machine learning model. Ransomware detection process 10 may monitor for a ransomware attack on the storage system in real-time based upon, at least in part, the processing of the plurality of IO features using the machine learning model.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
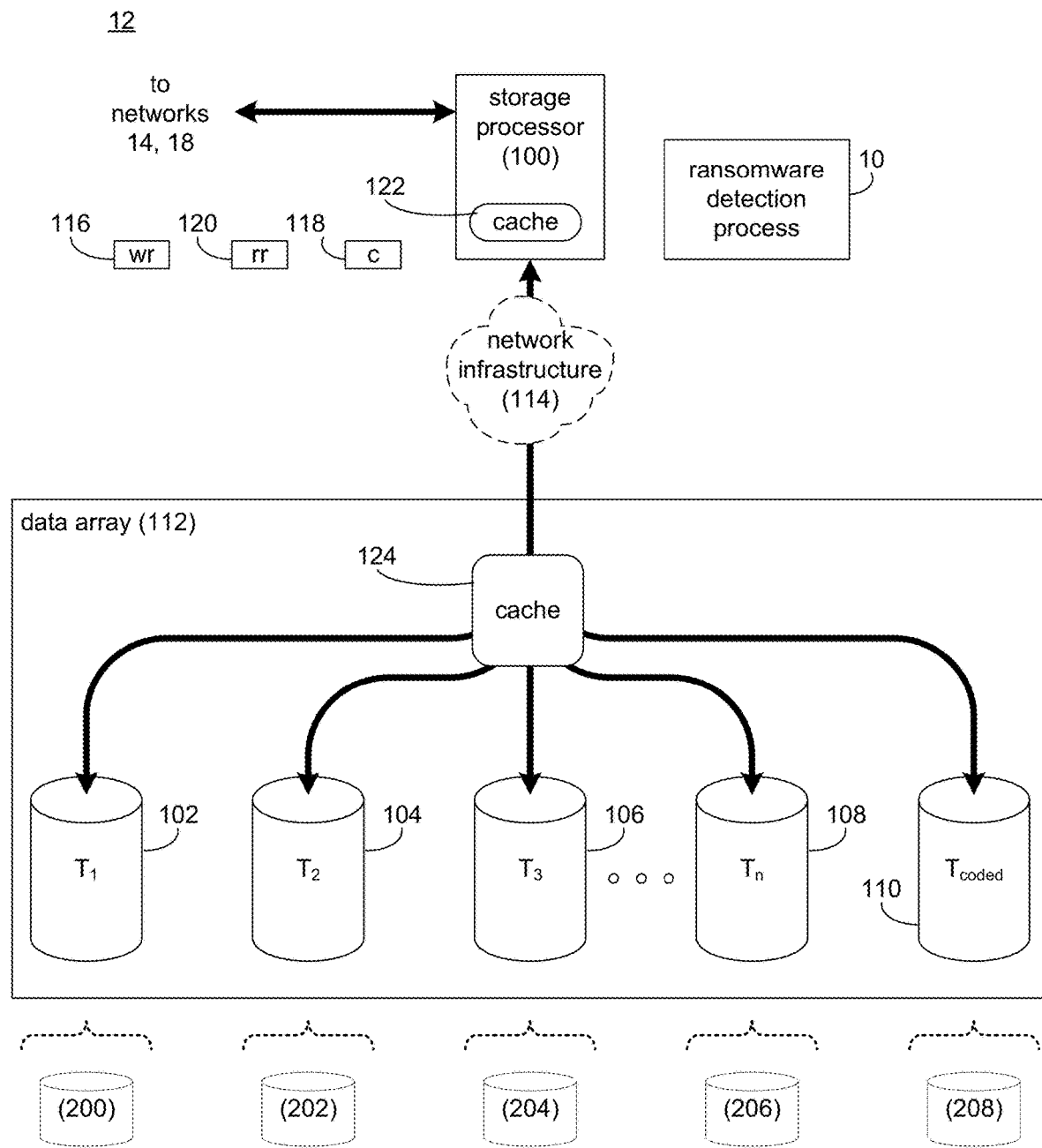
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of ransomware detection process 10. The instruction sets and subroutines of ransomware detection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of ransomware detection process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of ransomware detection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of ransomware detection process 10 may be executed by one or more processors (not shown) and one or more memory architectures (not shown) included within data array 112.

Figure 3:
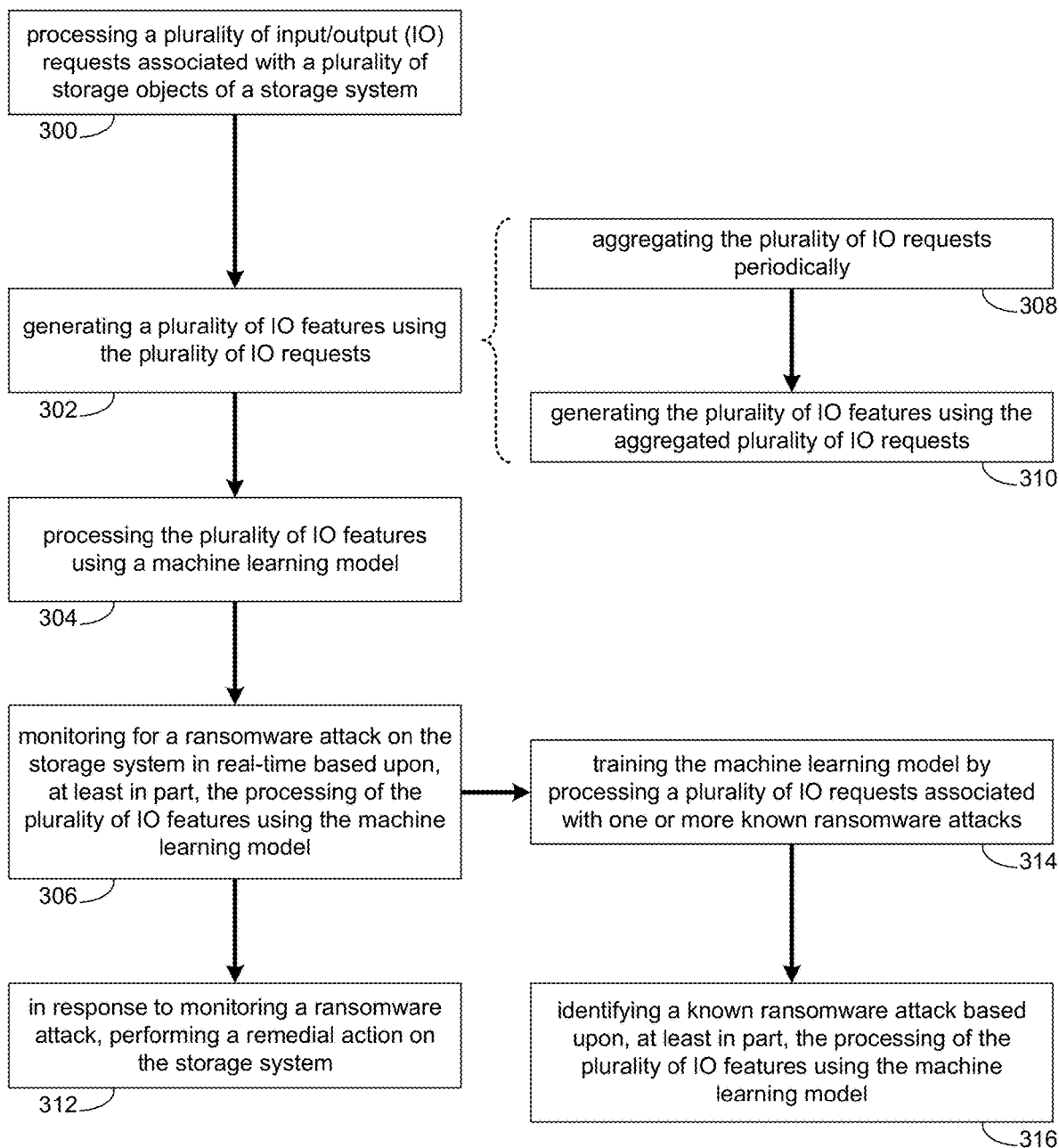
FIG. 3 is an example flowchart of ransomware detection process according to one or more example implementations of the disclosure.
Figure 4:
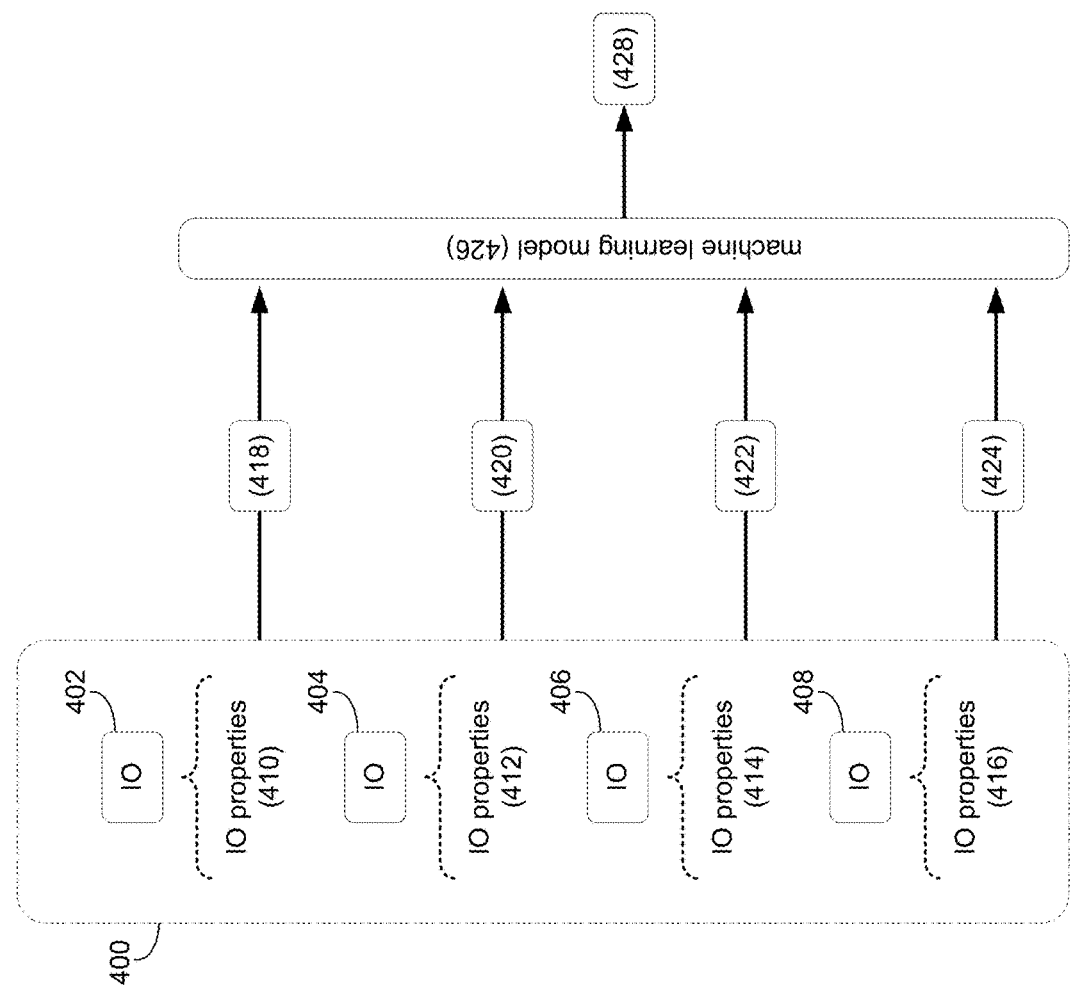
FIG. 4 is an example diagrammatic view of the ransomware detection process according to one or more example implementations of the disclosure.
Figure 5:
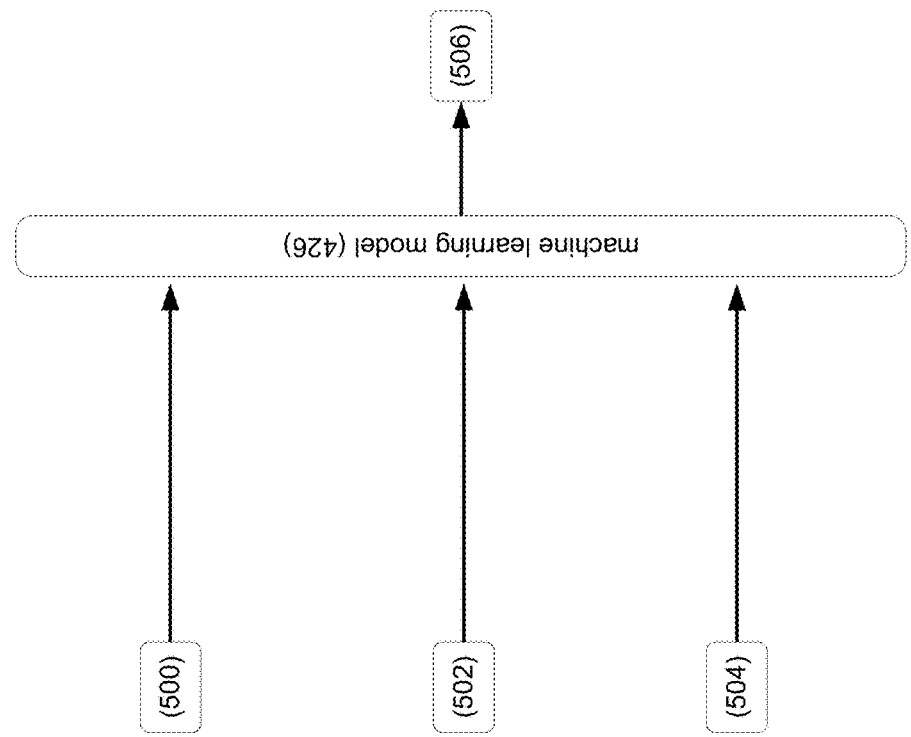
FIG. 5 is an example diagrammatic view of the training of a machine learning model according to one or more example implementations of the disclosure.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).
The Ransomware Detection Process:

Referring also to the examples of FIGS. 3-5 and in some implementations, ransomware detection process 10 may process 300 a plurality of input/output (IO) requests associated with a plurality of storage objects of a storage system. A plurality of IO features are generated 302 using the plurality of IO requests. The plurality of IO features are processed 304 using a machine learning model. Ransomware detection process 10 may monitor 306 for a ransomware attack on the storage system in real-time based upon, at least in part, the processing of the plurality of IO features using the machine learning model.

As will be discussed in greater detail below, implementations of the present disclosure may allow for real-time or near real-time monitoring and detection of ransomware attacks on a storage system. Ransomware attacks are a primary security threat in today's world and are becoming more and more prevalent. Accurate detection is crucial, since a false negative is a failure to detect an ongoing ransomware attack, while a false positive indicates a false alarm which may cause users of a storage system to halt normal business operations and start a lengthy investigation process. There are different ransomware variants utilizing particular modes of operation (threats, tactics and procedures) which makes detecting a ransomware attack in general (i.e., a binary classification) more challenging, and detection of a specific type of attack (i.e., multi-class classification) even more challenging. Conventional approaches are focused on detection of ransomware attacks on a host, where the attack is occurring (i.e., where the ransomware is being executed). However, in an enterprise setting, the storage is typically separate from the host, using a file or block storage device or storage system. Detection of ransomware attacks on the storage system as opposed to the host poses a unique challenge since the storage system does not have direct access to information about the execution of the ransomware attack.

Conventional approaches detect ransomware attack by postmortem analysis, hours or days after an attack occurs. The practical benefit of such an approach is limited since it is too late for the user or customer to take steps to block or mitigate the attack, and the damage is already done. As will be discussed in greater detail below, implementations of the present disclosure analyze the stream of input/output (IO) operations issued from the host to the storage system (i.e., dynamic analysis), and also the resulting changes in the data that is stored (i.e., static analysis). For example, ransomware detection process 10 uses a supervised machine learning classification model to detect ransomware attacks on storage systems as they are occurring, with high accuracy. As such, implementations of the present disclosure: 1) analyze IO workloads running against the storage device in real time or near-real time; 2) generate innovative IO features for machine learning using both aggregate counters and the relationships between individual IO requests; 3) generate a machine learning classification model that can differentiate between a ransomware workload and a benign workload, with high accuracy; 4) extends the machine learning model to handle multi-class classification (i.e., detection of specific ransomware attack variants); 5) enhance the machine learning model to mitigate the risk of model overfitting because of the imbalance between the benign class and the (one or more) ransomware attack class(es). In some implementations, ransomware detection process 10 is applicable for both file and block storage devices.

In some implementations, ransomware detection process 10 processes 300 a plurality of input/output (IO) requests associated with a plurality of storage objects of a storage system. For example and referring again to FIG. 2, during the operation of a storage system (e.g., storage system 12), IO operations may be generated for processing data on various storage objects (e.g., storage objects 200, 202, 204, 206, 208). Storage objects (e.g., storage objects 200, 202, 204, 206, 208) may generally include any container or storage unit configured to store data within a storage system (e.g., storage system 12). For example, a storage object may be any one of the following: a volume (aka Logical Unit Number (LUN)), a file, or parts thereof that may be defined e.g. by offsets or address ranges (e.g., sub-LUNs, disk extents, and/or slices). In some implementations, the plurality of storage objects include a block storage object and/or a file storage object. A block storage object is a block or chunk of storage that can be accessed by various operating systems. In some implementations, a file storage object is a folder or subset of a hierarchical data structure accessible by a particular path within the hierarchical data structure. As will be discussed in greater detail below, ransomware detection process 10 is able to detect a ransomware attack by generating IO features for block storage objects and/or file storage objects.

Referring also to FIG. 4, a plurality of IO requests (e.g., plurality of IO requests 400) may include e.g., four IO requests associated with various storage objects and/or the same storage object. IO request 402 may include a request to perform a read IO operation on a first storage object (e.g., storage object 200); IO request 404 may include a request to perform a write IO operation on storage object 200; IO request 406 may include a request to perform a read IO operation on storage object 200; and IO request 408 may include a request to perform an operation on storage object 200. While four separate IO requests for a single storage object have been described, it will be appreciated that this is for example purposes only and that any number of IO requests may be received for any number of storage objects within the present disclosure.

In some implementations, ransomware detection process 10 generates 302 a plurality of IO features using the plurality of IO requests. An IO feature is a representation of a plurality of IO properties associated with a particular storage object over a period of time. In some implementations, an IO feature is used by a machine learning model to identify trends indicative of a ransomware attack involving the storage object. Examples of IO features include a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; etc.

In some implementations, ransomware detection process 10 generates 300 the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of IO requests. In this manner, ransomware detection process 10 may extract various IO properties associated with the plurality of IO requests. Referring again to FIG. 4 and in some implementations, ransomware detection process 10 may extract one or more IO properties from plurality of IO requests 400. For example, ransomware detection process 10 may extract IO properties 418 from IO request 402; IO properties 420 from IO request 404; IO properties 422 from IO request 406; and IO properties 424 from IO request 408.

In some implementations, generating 300 the plurality of IO features using the plurality of IO requests includes aggregating 308 the plurality of IO requests periodically, and generating 310 the plurality of IO features using the aggregated plurality of IO requests. For example, ransomware detection process 10 may aggregate the one or more IO properties periodically to optimize for memory/storage requirements and/or CPU costs. Additionally, ransomware detection process 10 may use a sampling approach where IO properties for every "n"th IO request are extracted. In some implementations, the number of IO requests between extracting the one or more IO properties may be user-defined, a default number of IO requests, and/or defined automatically by ransomware detection process 10. In this manner, ransomware detection process 10 may limit the amount of processing of IO requests to generate IO features by sampling and aggregating 308 a limited set of all of the IO requests received at the storage system. Referring again to FIG. 4 and in some implementations, ransomware detection process 10 may aggregate 308 IO properties 410 from IO request 402; IO properties 412 from IO request 404; IO properties 414 from IO request 406; and IO properties 416 from IO request 408 and generate 310 a plurality of IO features (e.g., IO features 418, 420, 422, 424).

In some implementations, ransomware detection process 10 processes 304 the plurality of IO features using a machine learning model. A machine learning model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure. Ransomware detection process 10 may use any machine learning model or other machine learning algorithm to classify a plurality of IO features associated with a storage object as being indicative of a ransomware attack. In one example, a random-forest machine learning model may be used due to its generality, simplicity, tunability, and ability to cope with over-fitting. However, it will be appreciated that various machine learning models may be used within the scope of the present disclosure to process 304 the plurality of IO features. Referring again to FIG. 4 and in some implementations, ransomware detection process 10 may process 304 the plurality of IO features (e.g., IO features 418, 420, 422, 424) using a machine learning model (e.g., machine learning model 426).

In some implementations, ransomware detection process 10 monitors 306 for a ransomware attack on the storage system in real-time based upon, at least in part, the processing of the plurality of IO features using the machine learning model. A ransomware attack is an attack involving a type of malicious software that threatens to publish or blocks access to data or a computer system, usually by encrypting it, until the victim pays a ransom fee to the attacker. In many cases, the ransom demand comes with a deadline. If the victim does not pay in time, the data is gone forever or the ransom increases. As discussed above, ransomware attacks are becoming more and more frequent. Studies estimate that there is a ransomware attack every eleven seconds. Nevertheless, considering the vast number of IO requests that are being executed on storage systems around the world every second, a ransomware attack is a statistically rare event. The class imbalance between ransomware attacks and benign workloads likely exceeds 1:1,000,000. As such, this raises the concern of model overfitting. To reduce this risk, various machine learning techniques such as resampling (over-sampling the small class, under-sampling the large class), SMOTE (i.e., a machine learning technique that solves problems that occur when using an imbalanced data set), etc. may be used by ransomware detection process 10 within the scope of the present disclosure.

As discussed above, conventional approaches to ransomware detection is accomplished by postmortem analysis, hours or days after an attack occurs. The practical benefit of such an approach is limited since it is too late for the user or customer to take steps to block or mitigate the attack, and the damage is already done. By contrast, ransomware detection process 10 analyzes the stream of input/output (IO) operations issued from the host to the storage system (i.e., dynamic analysis), and also the resulting changes in the data that is stored (i.e., static analysis) to generate IO features. Ransomware detection process 10 uses a supervised machine learning classification model to detect ransomware attacks on storage systems as they are occurring, with high accuracy. In this manner, "real-time" or "near real-time" monitoring means monitoring and detecting ransomware attacks as they are occurring and within the time for processing the plurality of IO requests, generating the plurality of IO features, and processing the plurality of IO features using the machine learning model. In one example, ransomware detection process 10 aggregates and generates the plurality of IO features every e.g., five minutes. In this example, ransomware detection process 10 is able to monitor for ransomware attacks in real-time or near real-time based on the timing associated with generating the plurality of IO features during a ransomware attack.

As shown in FIG. 4, ransomware detection process 10 monitors 306 for a ransomware attack on the storage system in real-time based upon, at least in part, the processing of the plurality of IO features (e.g., IO features 418, 420, 422, 424) using the machine learning model (e.g., machine learning model 426). In some implementations, monitoring 306 for a ransomware attack on the storage system in real-time includes using the plurality of IO features (e.g., IO features 418, 420, 422, 424) to generate a ransomware attack probability score (e.g., ransomware attack probability score 428). In some implementations, ransomware attack probability score 428 is a score ranging from zero to one indicating a probability that a ransomware attack is occurring involving the storage object. In some implementations, ransomware detection process 10 uses ransomware attack probability score 428 to distinguish normal IO request workloads from potential ransomware attacks.

In some implementations and in response to monitoring 306 a ransomware attack, ransomware detection process 10 performs 312 a remedial action on the storage system. For example, ransomware detection process 10 may include one or more thresholds for evaluating ransomware attack probability scores. In some implementations, the threshold(s) for particular ransomware attacks may be predefined, user-defined, and/or automatically defined using ransomware detection process 10. For example, ransomware detection process 10 may define a threshold between a false negative and a false positive (i.e., binary classification). In one example, the default threshold may be 0.5. In some implementations, ransomware detection process 10 may tune the threshold up or down for particular situations (e.g., increasing the threshold for those less willing to have a false positive or decreasing the threshold for those preferring to be alerted about all potential ransomware attacks).

Ransomware detection process 10 may perform 312 a remedial action on the storage system when the ransomware attack probability score exceeds the threshold(s). For example, the remedial action may include generating an alert (e.g., for a storage system administrator, for one or more hosts/users of the storage system, etc.); suspending one or more IO requests on the storage object and/or the storage system; logging the plurality of IO features for training the machine learning model; etc. In some implementations, ransomware detection process 10 may process a plurality of IO requests and aggregate in-memory counters relevant to the plurality of IO features used by a machine learning model. At every fixed time interval (e.g., 5 minutes), ransomware detection process 10 aggregates the memory counters and calculates the relevant features. In some implementations, ransomware detection process 10 can also trigger the generation of the plurality of IO features if the storage system is running out of room in the memory area dedicated for the counters.

Periodically (e.g., every 15 minutes) the latest machine learning model may be invoked to calculate the risk of ransomware attacks for all the storage objects in the storage system, or only for the relevant ones. For example, ransomware detection process 10 may focus on storage objects that had significant IO activity and specifically write IO requests, over the recent time interval. In some implementations, when the predicted risk is higher than the default, or a threshold set for a particular storage system, an alert may be issued, with all the relevant details, including the statistics of the IO patterns that triggered the alert. In some implementations, the storage system may report (e.g., to various computing devices, monitoring systems, etc.) instances of ransomware alert firing, along with detailed ransomware data, and/or feedback, indicating whether the alert was deemed correct (i.e., a true positive) or not (i.e., a false positive). Ransomware detection process 10 may also send a similar report if a user reports on a ransomware attack on the storage system that was not alerted (i.e., a false negative). In some implementations, these reports may be used tune the machine learning model to improve its accuracy.

In some implementations, ransomware detection process 10 trains 314 the machine learning model by processing a plurality of IO requests associated with one or more known ransomware attacks. For example, ransomware detection process 10 may obtain traces of well-known or new ransomware attack variants. In one example, ransomware detection process 10 may execute a known ransomware attack in a secure environment, typically known as a "dirty lab". During the execution, ransomware detection process 10 can run a utility that captures a trace of the IO requests labeled with the specific ransomware attack variant. In another example, ransomware attack traces may be obtained from reliable open source or closed source malware repositories. These traces can be added to a training set used in building or updating the machine learning model. In some implementations, model training can be done in a centralized location such as the cloud. In this example, a machine learning model can be trained periodically (e.g., weekly) or when new ransomware attack variants become available, and IO traces of their execution are obtained. Trained or updated machine learning models may be distributed by ransomware detection process 10 to all relevant storage systems. Referring also to FIG. 5, ransomware detection process 10 may train 314 a machine learning model (e.g., machine learning model 426) by processing training data (e.g., training data formed from IO features 500, 502, 504) associated with a known ransomware attack to generate a threshold or other classification basis (e.g., ransomware attack classification 506) for the known ransomware attack. In some implementations, ransomware detection process 10 may train 314 the machine learning model (e.g., machine learning model 426) to recognize IO features associated with particular known ransomware attacks such that machine learning model 426 provides a ransomware attack probability score and a ransomware attack classification (e.g., ransomware attack classification 506) indicating which ransomware attack is being observed from the plurality of IO features.

In some implementations, monitoring for a ransomware attack on the storage system in real-time includes identifying 316 a known ransomware attack based upon, at least in part, the processing of the plurality of IO features using the machine learning model. For example, when training 314 the machine learning model, ransomware detection process 10 may use training data specific to a particular ransomware attack type to identify a known ransomware attack at runtime. As discussed above and in some implementations, ransomware detection process 10 may process 302 the plurality of IO features using the machine learning model to generate a ransomware attack classification indicating a particular ransomware attack is being observed. The ransomware attack classification may include a probability score associated with one or more ransomware attacks. In this manner, ransomware detection process 10 may provide the likelihood that a storage object is being subjected to a known ransomware attack in real-time or near real-time by generating a probability score associated with the known ransomware attack.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combina- The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    processing a plurality of input/output (IO) requests associated with a plurality of storage objects of a storage system;
    generating a plurality of IO features using the plurality of IO requests, wherein each IO request of the plurality of IO requests has a plurality of IO features associated with the IO request;
    processing the plurality of IO features using a machine learning model;
    monitoring for a ransomware attack on the storage system in real-time based upon, at least in part, the processing of the plurality of IO features using the machine learning model; and
    in response to monitoring a ransomware attack, performing a remedial action on the storage system, wherein the remedial action includes suspending one or more IO requests on the storage object.

2. The computer-implemented method of claim 1, wherein the plurality of storage objects include at least one of a block storage object and a file storage object.

3. The computer-implemented method of claim 1, wherein the plurality of IO features include one or more of:
    a number of IO requests per second (IOPS);
    a total number of read IO requests;
    a total number of write IO requests;
    a percentage of sequential read IO requests; and
    a percentage of sequential write IO requests.

4. The computer-implemented method of claim 1, wherein generating the plurality of IO features using the plurality of IO requests includes:
    aggregating the plurality of IO requests periodically; and
    generating the plurality of IO features using the aggregated plurality of IO requests.

5. The computer-implemented method of claim 1, further comprising:
    training the machine learning model by processing a plurality of IO requests associated with one or more known ransomware attacks.

6. The computer-implemented method of claim 5, wherein monitoring for a ransomware attack on the storage system in real-time includes identifying a known ransomware attack based upon, at least in part, the processing of the plurality of IO features using the machine learning model.

7. A computer program product residing on a non-transitory computer readable medium having a plurality of instructions stored thereon which, when executed by a processor, cause the processor to perform operations comprising:
    processing a plurality of input/output (IO) requests associated with a plurality of storage objects of a storage system;
    generating a plurality of IO features using the plurality of IO requests, wherein each IO request of the plurality of IO requests has a plurality of IO features associated with the IO request;
    processing the plurality of IO features using a machine learning model;
    monitoring for a ransomware attack on the storage system in real-time based upon, at least in part, the processing of the plurality of IO features using the machine learning model; and
    in response to monitoring a ransomware attack, performing a remedial action on the storage system, wherein the remedial action includes suspending one or more IO requests on the storage object.

8. The computer program product of claim 7, wherein the plurality of storage objects include at least one of a block storage object and a file storage object.

9. The computer program product of claim 7, wherein the plurality of IO features include one or more of:
    a number of IO requests per second (IOPS);
    a total number of read IO requests;
    a total number of write IO requests;
    a percentage of sequential read IO requests; and
    a percentage of sequential write IO requests.

10. The computer program product of claim 7, wherein generating the plurality of IO features using the plurality of IO requests includes:
    aggregating the plurality of IO requests periodically; and
    generating the plurality of IO features using the aggregated plurality of IO requests.

11. The computer program product of claim 7, wherein the operations further comprise:
    training the machine learning model by processing a plurality of IO requests associated with one or more known ransomware attacks.

12. The computer program product of claim 11, wherein monitoring for a ransomware attack on the storage system in real-time includes identifying a known ransomware attack based upon, at least in part, the processing of the plurality of IO features using the machine learning model.

13. A computing system comprising:
a memory; and
a processor configured to process a plurality of input/output (IO) requests associated with a plurality of storage objects of a storage system, wherein the processor is further configured to generate a plurality of IO features using the plurality of IO requests, wherein each IO request of the plurality of IO requests has a plurality of IO features associated with the IO request, wherein the processor is further configured to process the plurality of IO features using a machine learning model, wherein the processor is further configured to monitor for a ransomware attack on the storage system in real-time based upon, at least in part, the processing of the plurality of IO features using the machine learning model, and wherein the processor is further configured to, in response to monitoring a ransomware attack, perform a remedial action on the storage system, wherein the remedial action includes suspending one or more IO requests on the storage object.

14. The computing system of claim 13, wherein the plurality of storage objects include at least one of a block storage object and a file storage object.

15. The computing system of claim 13, wherein the plurality of IO features include one or more of:
   a number of IO requests per second (IOPS);
   a total number of read IO requests;
   a total number of write IO requests;
   a percentage of sequential read IO requests; and
   a percentage of sequential write IO requests.

16. The computing system of claim 13, wherein generating the plurality of IO features using the plurality of IO requests includes:
   aggregating the plurality of IO requests periodically; and
   generating the plurality of IO features using the aggregated plurality of IO requests.

17. The computing system of claim 13, wherein the processor is further configured to:
   training the machine learning model by processing a plurality of IO requests associated with one or more known ransomware attacks.

18. The computing system of claim 17, wherein monitoring for a ransomware attack on the storage system in real-time includes identifying a known ransomware attack based upon, at least in part, the processing of the plurality of IO features using the machine learning model.

* * * * *